Jan. 13, 1959  R. WEISS  2,868,097
LENS AND FILTER HOLDER FOR PHOTOGRAPHIC CAMERAS
Filed June 29, 1954  2 Sheets-Sheet 1

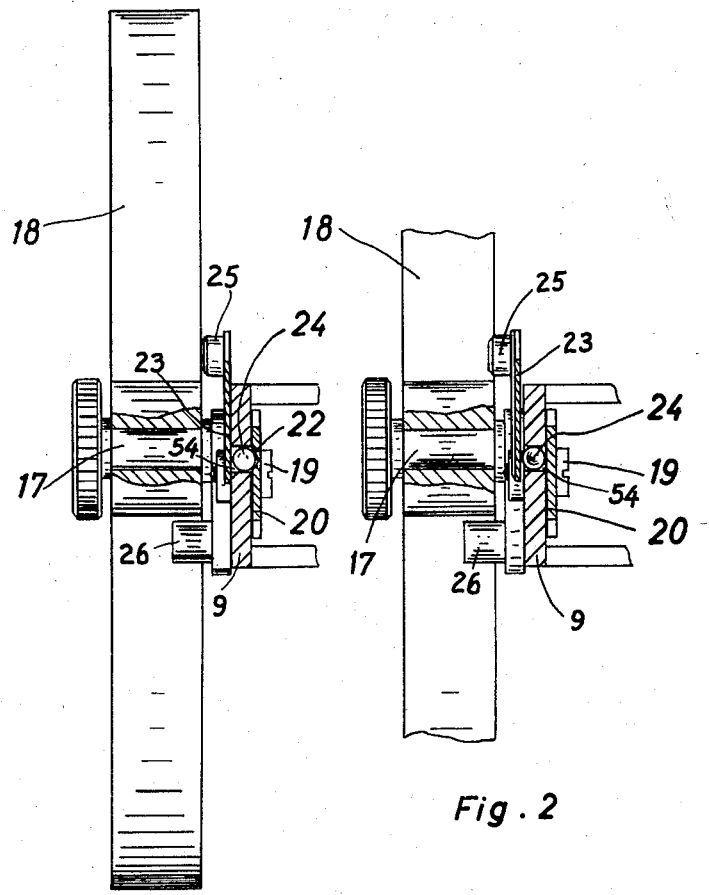

United States Patent Office 2,868,097
Patented Jan. 13, 1959

2,868,097

LENS AND FILTER HOLDER FOR PHOTOGRAPHIC CAMERAS

Richard Weiss, Braunschweig, Germany, assignor to Franke & Heidecke, Fabrik Photographischer Prazisions-Apparate, Braunschweig, Germany, a German firm Application June 29, 1954, Serial No. 440,199

Claims priority, application Germany July 1, 1953

7 Claims. (Cl. 95—11)

This invention relates to a holder for holding supplementary optical elements, such as filters or supplementary lenses, in effective or ineffective position, as desired, in front of the ordinary lens or lenses of a photographic camera, particularly a camera enclosed within a supplementary protective housing to enable the camera to be used in taking pictures in locations where it could not otherwise be used, as for example taking pictures under water.

When a camera is enclosed within such a supplementary protective housing to enable taking of pictures under water, it is necessary, of course, to provide external control members accessible on the outside of the protective housing, for operating the various parts of the camera within the housing, such as the film winding mechanism, the shutter controls, etc. The number of separate control members passing through the wall of the protective housing should preferably be reduced to a minimum, since each control member extending through the housing wall presents an additional hazard of leakage of water into the housing.

The present application constitutes in part an improvement upon my copending application filed concurrently herewith, Serial No. 440,198, filed June 29, 1954.

An object of the present invention is to provide satisfactory and simple mechanism by which a filter or a supplementary lens may be held in either effective or ineffective position, as desired, on a camera located within a watertight protective housing, without requiring any special shaft passing through a wall of the protective housing, thereby reducing the number of shafts which have to be sealed in a watertight manner.

Another object of the invention is the provision of means for holding a supplementary optical element (such as a filter or a supplementary lens) in such manner that it is shifted by gravity from effective to ineffective position, and vice versa, and is held in its selected position by gravity.

Still another object is the provision of supplementary locking mechanism for locking the holder positively in either effective or ineffective position, as desired, which locking mechanism is controlled by another shaft which serves another control purpose, without requiring a separate shaft of its own.

These and other desirable objects may be attained in the manner disclosed as an illustrative embodiment of the invention in the following description and in the accompanying drawings forming a part hereof, in which:

Fig. 2 is a side elevation with parts broken away and parts in vertical section, of the locking mechanism for holding the lens or filter holder in one position or the other, showing this locking mechanism in its locking position; and Fig. 3 is a similar view showing the parts in the released or unlocking position, to enable movement of the filter or lens holder.

The same reference numerals throughout the several views indicate the same parts.

Figure 1:
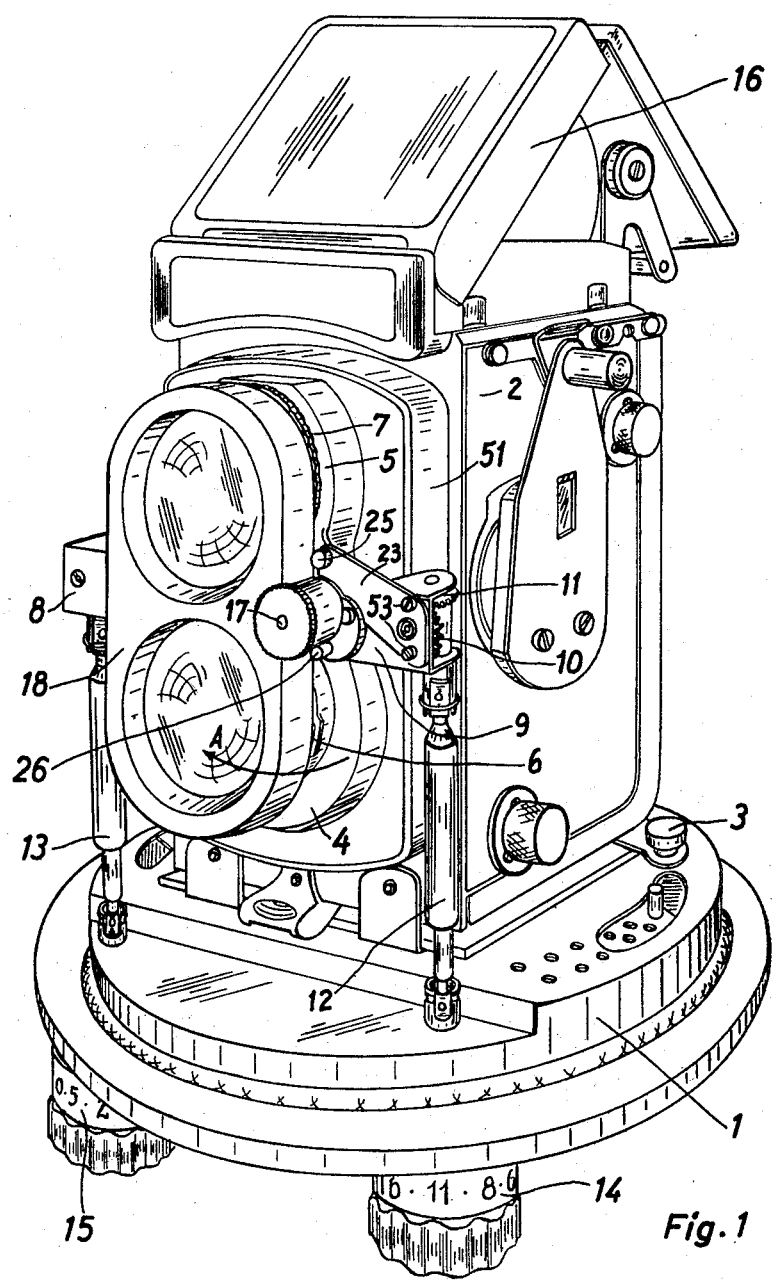
Fig. 1 is a perspective view of a camera equipped with the holder of the present invention, and mounted on part of the watertight protective housing, most of the housing being omitted for the sake of showing the interior parts.

In the present application, as in the companion application above identified, a watertight protective housing is provided to enable the taking of pictures under water, by ordinary roll film cameras of the type commonly carried in the hand. Specifically, the invention is disclosed in a form especially adapted for use with the well known "Rolleiflex" camera manufactured by the firm of Franke & Heidecke, in Germany, and well known and widely used in the United States of America as well as many other countries, although the invention may easily be adapted to various other makes or models of cameras. The present disclosure presupposes that the reader is already familiar with the "Rolleiflex" camera, the principal parts of which are disclosed in the book "Rollei Photography, Handbook of the Rolleiflex and Rolleicord Cameras" by Jacob Daschin, published 1952 by Camera Craft Publishing Company, San Francisco, California (192 pages) and also the pamphlet entitled "Rolleiflex 2.8C in Practical Use" published 1953 by Franke & Heidecke, the manufacturers of the camera, a copy of which pamphlet is believed to be available in the Scientific Library of the U. S. Patent Office. As will be understood by those who are familiar with the camera itself or who have read the above mentioned publications, the camera is of the twin lens reflex type, having a lower or picture taking lens within the mount 4 and an upper or finder lens within the mount 5, both mounted on a camera front member 51 which moves forwardly and backwardly relative to the main camera body 2 for purposes of focusing. When the usual shutter is opened, light enters the main or picture taking lens in the mount 4 and falls upon film at the rear of the main camera chamber. Light also enters the upper or finder lens through the mount 5, is reflected upwardly by a mirror within the camera body, and throws an image on a focusing screen arranged approximately horizontally at the top of the camera. At the top of the camera is a foldable focusing hood, here indicated in general by the numeral 16. The hood may be constructed, for example, substantially in the manner disclosed in U. S. Patent 2,641,955 issued June 16, 1953, for an invention of H. Bretthauer. The construction of the hood as well as the construction of many of the other parts of the camera is not directly concerned with the present invention, but is mentioned merely as general background information to facilitate an understanding of the preferred form of camera with which the present invention is used.

The protective housing includes a base 1 constituting a removable bottom of the protective housing, the camera 2 resting on this base 1 and being secured thereto by a chuck or clamping jaw arrangement controlled by a lever 3.

The lens mounts 4 and 5 include, as usual in the "Rolleiflex" camera, bayonet mounts on which the various accessories may be placed, a fragment of the lower bayonet mount being shown at 6, the upper one being hidden from view. A ring or barrel 7 provided with cooperating bayonet parts is engaged with and supported by the bayonet mount of the upper lens mount 5, and this ring or barrel 7 serves as a support for laterally extending arms 8 and 9 which may either be formed integrally on the ring 7 or may be formed on a plate supported by the ring.

These arms 8 and 9 carry rearwardly faced cup shaped rotatable members to fit over and drive the rotatable frusto-conical knobs which serve to adjust the shutter speed and the diaphragm aperture in cameras of this kind. These cup shaped members, hidden from view in Fig. 1 of the drawings of the present application, are driven through intermediate gears mounted on the rear faces of the arms 8 and 9 and through spur and bevel gears 10 and 11, from drive shafts 12 and 13 provided with universal joints and telescopic sections, which shafts extend in watertight sealed manner through the wall 1 of the protective housing and are provided with external control knobs 14 and 15, for setting the diaphragm aperture and shutter speed, respectively, to settings indicated by the graduated scales marked on these knobs.

The arm 9 is provided with a forwardly extending pivot pin 17 on which is pivoted a holder 18 for holding, as desired, a filter or a pair of supplementary lenses which, when the holder is in effective position, lie in front of the picture taking lens and finder lens. It will be seen in Fig. 1 that the pivot 17 is offset a considerable distance to one side of the center of the holder 18, so that gravity tends to rotate the holder 18 on its pivot 17 until the holder comes in contact with a stationary stop pin 26 which prevents further rotation and which, in the position shown, maintains the holder in a position of orientation such that its filters or lenses are accurately alined with the optical axes of the lenses 5 and 6. But when the releasable locking means described below is released, so that the holder 18 is free to rotate on its pivot 17, then the entire camera body may be turned over through one complete revolution in a counterclockwise direction when viewed as in Fig. 1, whereupon gravity will cause the holder 18 to swing around, substantially 180° from its position shown in Fig. 1, to an ineffective position on the opposite side of the pivot 17 and completely out of alinement with the lenses 5 and 6, gravity again holding the holder 18 against the opposite side of the stop pin 26.

Although gravity alone can be relied upon, if desired, to hold the filters or supplementary lenses in effective or ineffective position, as the case may be, it is preferable to provide locking means to prevent accidental displacement of the holder 18 from the selected position in which it has been placed. This locking means, according to the present invention, is controlled by one or the other of the adjusting shafts 12 and 13, without requiring any special shaft of its own. Thus a supplementary shaft for controlling the position of the supplementary lens or filter is unnecessary, thereby eliminating one watertight packing problem.

Due to the relatively poor lighting conditions in underwater photography, it is seldom or never that the photographer would wish to use the smallest diaphragm aperture. Advantage can be taken of this fact, to control the locking of the supplementary holder 18 from the shaft 12 and knob 14 when set to the smallest diaphragm aperture, which would seldom be otherwise used. For similar reasons, the very highest shutter speed is seldom likely to be used in underwater photography, and the lock for the supplementary lens or filter holder could be operated by moving the shutter speed control to the highest shutter speed. Or again, some other shutter speed setting which is not likely to be used in underwater photography, could be employed for controlling the lock, such as the setting for "B" or bulb exposure. But in general, it is preferred to control the lock from the diaphragm aperture control means when set to the smallest aperture.

The lock in its preferred form comprises a resilient arm 23, one end of which is rigidly secured to the front face of the stationary arm 9 as by screws 53, and the other end of which carries a forwardly projecting pin 25 lying in the same vertical plane with the pivot pin 17 and the stationary stop pin 26, so that this pin 25 may lie against the side of the holder 18 when this holder is either in its effective position or in its ineffective position. The resilience of the arm 23 normally tends to move the pin 25 rearwardly to a position out of alinement with the holder 18 (as seen in Fig. 3 of the drawings) but when forward pressure is exerted against the rear face of the resilient arm 23, such pressure will spring the arm forwardly until the pin 25 overlaps the holder 18 as seen in Fig. 2, thereby locking the holder (in conjunction with the stop pin 26) against turning on its pivot 17.

If the locking is to be accomplished by one of the setting positions of the diaphragm aperture control means, for the reasons above mentioned, then one of the spur gears 20 which meshes directly or indirectly with the spur gear 10 driven by the aperture adjusting shaft 12, and which turns on a pivot screw 19 secured to the arm 9, is provided with a depression 22 in its forward face. When the diaphragm aperture is adjusted to a selected one of its positions (such as the smallest aperture) this depression 22 in the gear 20 lies in alinement with a bore 54 extending through the arm 9 in a position behind an intermediate point of the resilient arm 23. A ball 24 lies in the bore 54. When the recess 22 in the gear 20 is in alinement with the bore, the ball 24 can enter the recess and thus exerts no forward pressure on the resilient arm 23. Therefore the resilient arm 23 may move rearwardly to its unlocking position shown in Fig. 3, so that the camera may be turned over, thereby causing the holder 18 to move by gravity from its effective position to its ineffective position, or vice versa. But when the diaphragm aperture control knob 14 is adjusted to turn the shaft 12, gear 10, and gear 20 to any other position except this one position, the ball 24 can no longer enter the recess 22 so it is forced forwardly a short distance and presses forwardly against the rear face of the resilient arm 23, thereby shifting this arm forwardly until the locking pin 25 overlaps the edge of the holder 18, as seen in Fig. 2. Hence the holder 18, whether in its effective or ineffective position, is caught between the fixed pin or abutment 26 and the movable pin or abutment 25 and cannot move to its other position, even if the camera be inverted. But if the diaphragm aperture is once more adjusted to its smallest opening (or to any other position selected for the purpose of controlling the locking of the holder 18) then the movable abutment or pin 25 moves out of the way, and the holder 18 may be swung by gravity from one position to the other, by inverting the camera.

If it is desired to control the locking of the holder by the shutter speed setting rather than by the diaphragm aperture setting, as above disclosed, then the pivot 17 is simply placed on the other side of the holder 18, on the arm 8, rather than on the arm 9, and the resilient locking arm 23 is likewise located on the arm 8, controlled by a recess in one of the gears in the gear train leading to the shutter speed control.

Although this arrangement is intended specifically for a holder for filters or supplementary lenses, the invention is not necessarily limited to this specific use. The same principles of the invention may be employed, within the mechanical skill of one acquainted with the above disclosure, for controlling the locking or unlocking of any gravity-moved part or auxiliary device within the supplementary casing or housing.

It is seen from the foregoing disclosure that the above-mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A photographic camera device comprising a camera body and a lens mounted thereon, a holder for a supplementary optical element, said holder being pivoted to said camera body on a pivot offset to one side of a line which extends vertically through said lens when said camera body is held in normal upright picture-taking position, said pivot also being eccentric with respect to the center of gravity of said holder, abutment means for limiting turning movement of said holder on said pivot to two extreme positions in one of which said supplementary optical element is alined with said lens and in the other of which said supplementary element is out of alinement with said lens, said pivot and abutment means being so placed that when said camera is in normal upright picture-taking position gravity will tend to maintain said holder in either one of said extreme positions in which it has been set and when said camera is rotated about an axis parallel to said pivot gravity will tend to swing said holder from one of its extreme positions to the other, a shaft having a manipulating element, a gear mounted on said camera and operatively connected to said shaft to be turned thereby, and locking mechanism carried by said camera body and controlled by said gear for locking said holder in either one of said extreme positions in which it has been set notwithstanding rotation of said camera about said axis.

2. A construction as defined in claim 1, in which said shaft normally serves to adjust an element of a photographic shutter associated with said lens, in addition to controlling the locking of said holder.

3. A construction as defined in claim 1, in which said shaft normally serves to adjust the diaphragm aperture of a photographic shutter associated with said lens, and in which said locking mechanism is unlocked to allow movement of said holder on its pivot only when said gear is moved to a position corresponding to the smallest diaphragm aperture and is locked in other positions of said gear.

4. A photographic camera device comprising a camera body and a lens mounted thereon, a holder for a supplementary optical element, said holder being pivoted to said camera body on a pivot offset to one side of a line which extends vertically through said lens when said camera body is held in normal upright picture-taking position, said pivot also being eccentric with respect to the center of gravity of said holder, and abutment means for limiting turning movement of said holder on said pivot to two extreme positions in one of which said supplementary optical element is alined with said lens and in the other of which said supplementary element is out of alinement with said lens, said pivot and abutment means being so placed that when said camera is in normal upright picture-taking position gravity will tend to maintain said holder in either one of said extreme positions in which it has been set and when said camera is rotated about an axis parallel to said pivot gravity will tend to swing said holder from one of its extreme positions to the other.

5. Control mechanism for controlling the position of a pivotally mounted gravity-actuated auxiliary device on a photographic camera, said control mechanism comprising a resilient arm, an abutment mounted on said arm and movable therewith upon flexing said arm from an ineffective position out of the path of movement of said auxiliary device to an effective locking position in the path of movement of said device, the resilience of said arm tending to move it from one of its said positions to the other, a movable intermediate element adapted to bear against said arm to move it from said other of its positions to said one of its positions, and a rotary control member in position to engage said intermediate element, said control member having a recess at one point which may be brought opposite said intermediate element when said control member is turned to a predetermined position, so that said intermediate element may move partially into said recess and allow the resilience of said arm to move it to the other of its said positions, said control member when turned to a position other than said predetermined position serving to hold said intermediate element in a position to hold said arm in said one of its said positions.

6. A photographic camera device comprising a lens mount, a holder pivotally mounted on said camera for swinging movement from a first position for holding a supplementary optical element in alinement with the optical axis of said lens mount to a second position holding said element out of alinement with said axis, said holder being pivoted at a point offset from its center of gravity so that gravity may tend to swing said holder from one position to the other when the camera is turned, a movable control member, and locking means controlled by said control member for unlocking said holder to allow swinging movement thereof when said control member is adjusted to one of its positions and for locking said holder against swinging movement when said control member is adjusted to other positions.

7. A construction as defined in claim 6, in which said control member serves to control the size of an adjustable diaphragm aperture, and in which said locking means is unlocked when said control member is adjusted to the smallest diaphragm aperture.

References Cited in the file of this patent

UNITED STATES PATENTS

| | | |
|---|---|---|
| 1,613,363 | Tessier | Jan. 4, 1927 |
| 2,059,361 | Kenworthy | Nov. 3, 1936 |
| 2,076,482 | Riszdorfer | Apr. 6, 1937 |
| 2,387,758 | Jaros | Oct. 30, 1945 |
| 2,573,885 | Whitman et al. | Nov. 6, 1951 |
| 2,606,477 | Leslie et al. | Aug. 12, 1952 |
| 2,660,926 | Talley | Dec. 1, 1953 |

FOREIGN PATENTS

| | | |
|---|---|---|
| 231,506 | Switzerland | Mar. 31, 1944 |
| 918,183 | France | Oct. 7, 1946 |